United States Patent
Hiura et al.

(10) Patent No.: US 6,817,264 B2
(45) Date of Patent: *Nov. 16, 2004

(54) PARKING BRAKE OPERATING DEVICE FOR VEHICLE

(75) Inventors: Tetsuo Hiura, Higashi Hiroshima (JP); Masanori Nakayama, Hiroshima (JP)

(73) Assignee: Kuroishi Iron Works Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/203,892

(22) PCT Filed: Jan. 31, 2001

(86) PCT No.: PCT/JP01/00677

§ 371 (c)(1),
(2), (4) Date: Aug. 15, 2002

(87) PCT Pub. No.: WO01/62565

PCT Pub. Date: Aug. 30, 2001

(65) Prior Publication Data

US 2003/0010149 A1 Jan. 16, 2003

(30) Foreign Application Priority Data

Feb. 25, 2000 (JP) ........................................ 2000-049485

(51) Int. Cl.[7] .............................. B60T 7/06; G05G 1/00; G05G 1/14
(52) U.S. Cl. .............................. 74/512; 74/535; 74/539; 74/542; 74/575; 74/577 R; 188/265; 188/216
(58) Field of Search .......................... 74/512, 539, 535, 74/542, 538, 575, 577 R; 188/265, 216

(56) References Cited

U.S. PATENT DOCUMENTS

| 3,897,694 A | * | 8/1975 | Hirst, Jr. ...................... 74/516 |
| 3,901,100 A | * | 8/1975 | Lida et al. ...................... 74/530 |
| 3,938,407 A | * | 2/1976 | Nisbet ........................... 74/516 |
| 4,872,368 A |   | 10/1989 | Porter ........................... 74/542 |
| 5,217,094 A |   | 6/1993 | Walter et al. .................. 188/210 |
| 5,247,850 A | * | 9/1993 | Lenzke ........................... 74/523 |
| 5,448,928 A | * | 9/1995 | Harger ........................... 74/523 |
| 5,588,335 A | * | 12/1996 | Strait ............................ 74/512 |
| 5,787,761 A | * | 8/1998 | Wang ............................. 74/535 |
| 5,832,784 A | * | 11/1998 | McCallips et al. ............ 74/512 |
| 6,073,513 A | * | 6/2000 | Huebner ........................ 74/535 |
| 6,508,341 B1 | * | 1/2003 | Hiura .......................... 188/265 |

FOREIGN PATENT DOCUMENTS

| DE | 39 24937 A1 |   | 7/1989 | ................ 74/575 |
| DE | 019859496 A1 | * | 7/2000 | ................ 74/575 |
| GB | 2 222 234 |   | 2/1990 | ................ 74/512 |
| GB | 2244117 A | * | 11/1991 | ................ 74/575 |
| JP | 64-18755 |   | 1/1989 | ................ 74/575 |
| JP | 7-257333 |   | 10/1995 | ................ 74/575 |
| JP | 10-24814 |   | 1/1998 | ................ 74/575 |

* cited by examiner

Primary Examiner—Vinh T. Luong
(74) Attorney, Agent, or Firm—Lorusso, Loud & Kelly

(57) ABSTRACT

A parking brake operating device for vehicle, wherein a vehicle is held by a specified braking force by manually rotating a brake lever (2), a held state is released by rotatingly operating the brake lever (2) upward by a specified amount from the held state, and the braking force can be changed to an increasing side and held by further raising the brake lever upward from the held state beyond the specified amount, whereby a release operation can be performed without using a push button or a push rod.

4 Claims, 17 Drawing Sheets

PARKING BRAKE OPERATING DEVICE FOR VEHICLE

TECHNICAL FIELD

The present invention relates to a manual parking brake operating device for a vehicle.

BACKGROUND ART

As a general parking brake operating device for a vehicle, a manual operating device $Z_0$ as shown in FIG. 17 is conventionally known. The device $Z_0$ comprises a bracket 101 secured to a vehicle body and a lever 102 pivoted on the bracket 101 for rotational movement in a vertical direction by a pivot pin 111. The bracket 101 has pawl teeth 109 arranged along an arc about the pivot pin 111.

The lever 102 has a base end part to which an arcuate cable guide 112 about which a brake wire 113 is trained is secured. When the lever 102 is lifted from a non-operative position shown by solid lines to an operative position shown by broken lines in FIG. 17, the brake wire 113 is pulled and a required operating force is applied to a brake (not shown) via the brake wire 113. A pawl member 107 is swingably supported on the lever 102 by a pin 106. A latch pawl 108 of the pawl member 107 is selectively locked with one of the pawl teeth 109 of the bracket 101, whereby an operating force corresponding to a rotational position of the lever 102 is maintained.

The lever 102 has a hollow part 110 therein and a push rod 104 for releasing the locking engagement of the latch pawl 108 with the pawl tooth 109 is provided in the hallow part 110. At the time of the releasing operation, a push button 105 projected from an end of the lever 102 is pressed with the lever 102 slightly lifted (namely, in a state where a meshing force generated between the pawl teeth 109 and the latch pawl 108 by a tensile force of the brake wire 113 is released to allow the push rod 104 to be pressed) to apply a rotational force in a direction to release the locking engagement to the pawl member 107 via the push rod 104, thereby releasing the locking engagement of the latch pawl 108 with the pawl teeth 109.

When a braking force is thought to be insufficient (namely, when the brake is thought to be working insufficiently) after lifting operation of the lever 102 has been conducted to set the braking force, a desired braking force can be obtained by further lifting the lever 102. In FIG. 12, reference numeral 103 indicates a grip provided around the lever 102.

The manual parking brake operating device $Z_0$ as above has the following problems:

(1) Since the brake operating device $Z_0$ is so constituted that the brake is released by pressing the push button 105, there is a possibility that the push button 105 is pressed by mistake during parking with the lever 102 lifted to exert a prescribed braking force and the braking force is unexpectedly released against the driver's will.

(2) In order to arrange the push rod 104 in an end part of the lever 102, at least a part of the lever 102 near the end must be formed into a cylindrical shape. As a result, the workability of the lever 2 is poor, causing increase in cost. Additionally, the shape of the lever 102 imposes a limitation on design of the grip 103 provided over the end part of the lever 2, so that the freedom in the design of the grip 103 is hindered.

(3) Since the push rod 104 is disposed in the lever 102, the lever 102 must be formed into as linear a shape as possible from the base end part to the end part in order to ensure a proper action of the push rod 104, so that the degree of freedom in layout of the operating device $Z_0$ on a vehicle is unavoidably low.

The present invention has been made in view of the problems of the conventional manual operating device for a vehicle parking brake.

According to the present invention, there is provided a brake operating device for a vehicle having a vehicle body provided with a brake, comprising:

a mounting bracket secured to said vehicle body;

a lever pivoted to said bracket so as to be rotated between first and second positions manually and operatively connected to said brake so that a braking force corresponding to an amount of rotation from said first position toward said second position is exerted on said brake;

a pawl teeth member having pawl teeth and secured to one of said bracket and said lever;

a latch pawl member supported on the other of said bracket and said lever and having a latch pawl engageable with said pawl teeth of said pawl teeth member, said latch pawl member being movable between a locked position in which said latch pawl is in locking engagement with said pawl teeth and an unlocked position in which said locking engagement of said latch pawl with said pawl teeth is released, said latch pawl member assuming said locked position, when said lever is rotated from said first position toward said second position, to maintain said lever in a rotational position and assuming said unlocked position, when said lever is further rotated from said rotational position toward said second position by a prescribed amount, to release said locking engagement of said latch pawl with said pawl teeth so that said lever may be allowed to rotate in either direction; and a position changing member supported on the other of said bracket and said lever by a single pin and adapted for shifting said latch pawl member from said unlocked position to said locked position when said lever is further rotated from said rotational position toward said second position beyond said prescribed amount.

Description will be next made of the present invention in detail with reference to the drawings, in which.

The preferred embodiments of the present invention will be hereinafter described in detail with reference to the drawings.

First Embodiment

Figure 1:
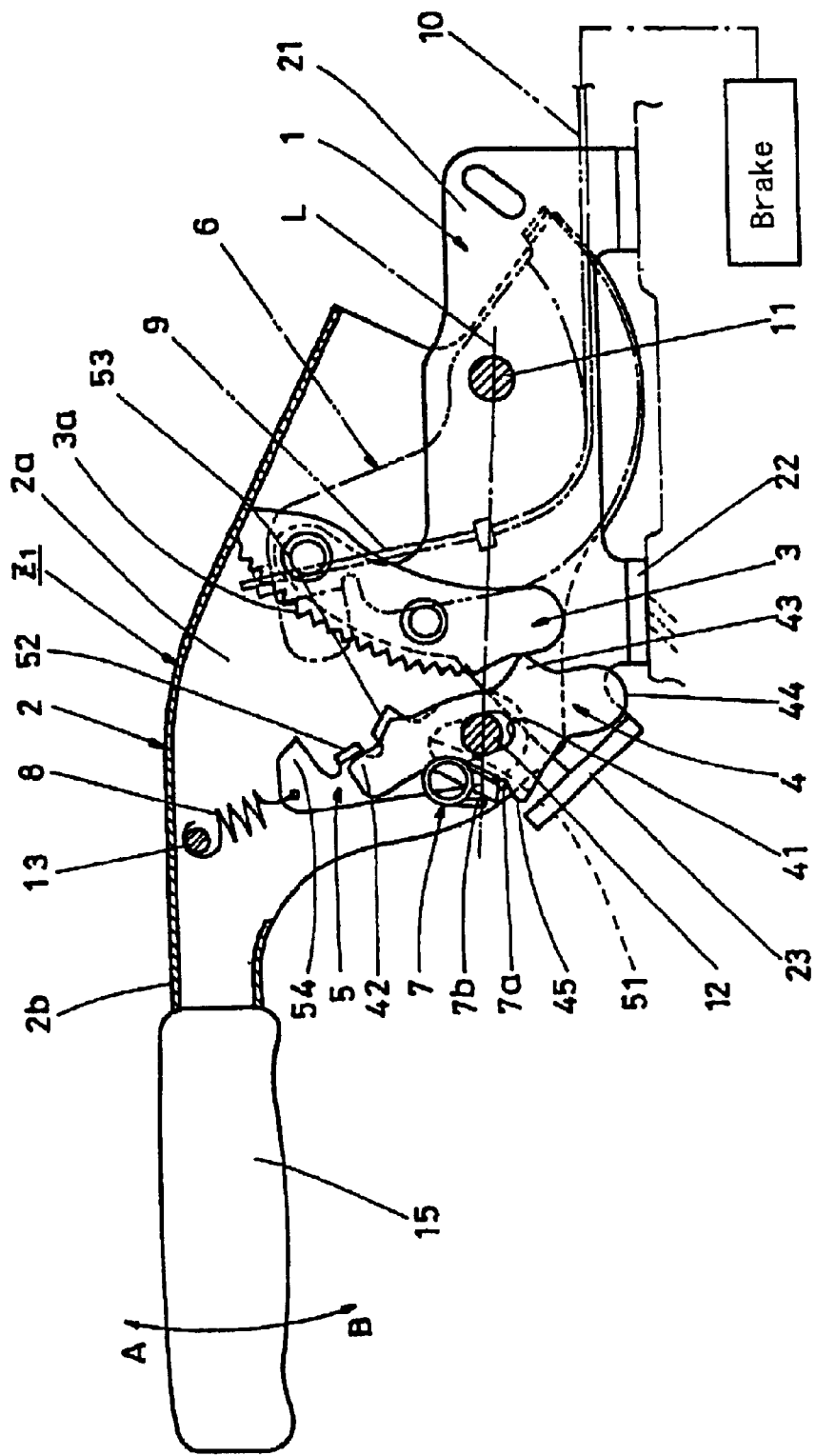
FIG. 1 is a general view illustrating an operating devise for a vehicle parking brake according to a first embodiment of the present invention.
Figure 2:
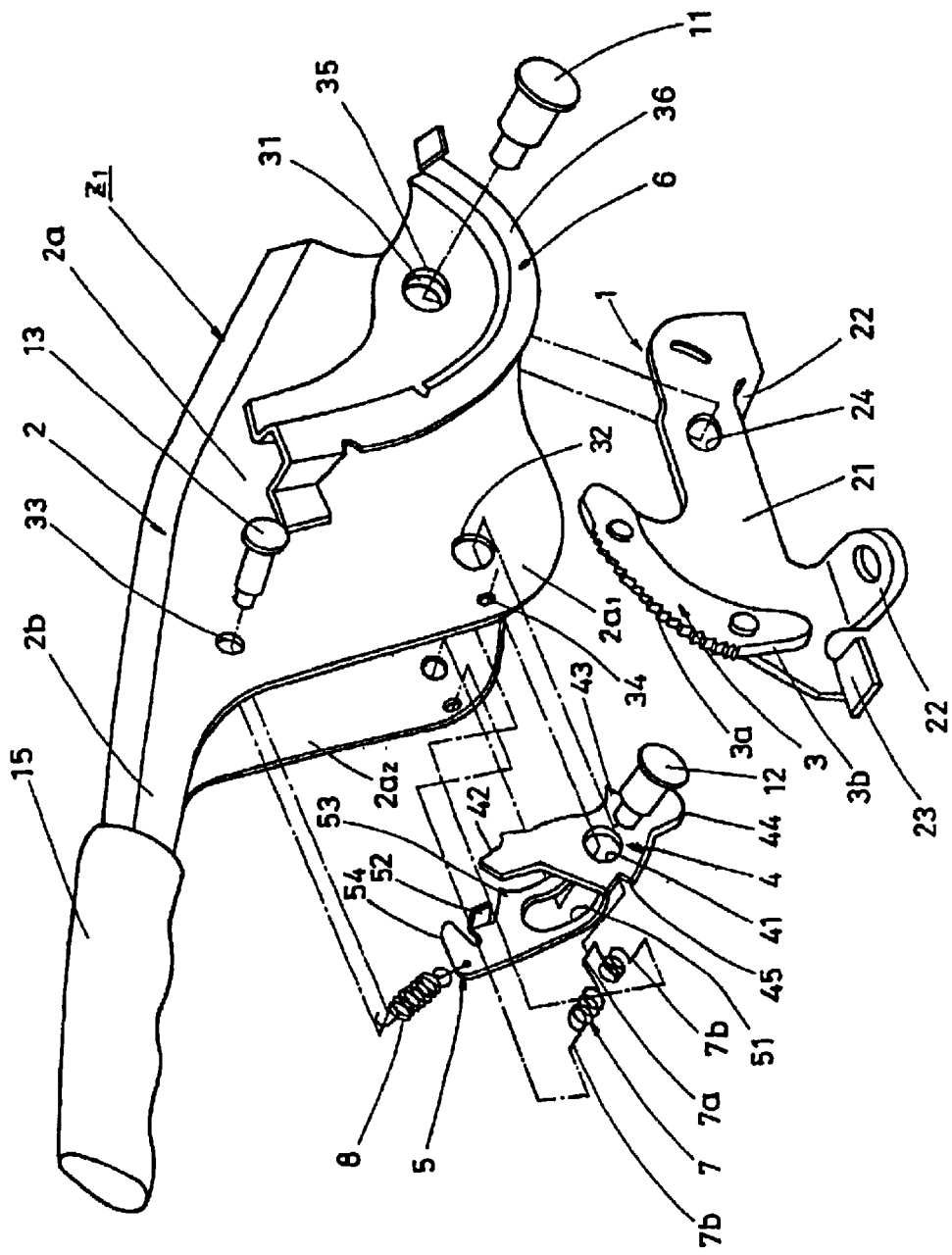
FIG. 2 is an exploded perspective view illustrating an on-assembling state of main component parts of the brake operating device shown in FIG. 1.

FIG. 1 shows a parking brake operating device $Z_1$ according to a first embodiment of the present invention, and FIG. 2 shows component parts thereof in a disassembled state. The brake operating device $Z_1$ is manually operated and comprises a bracket 1, a lever 2, a pawl teeth member 3, a latch pawl member 4, and a position changing member 5, which will be described below.

Mounting Bracket 1:

The mounting bracket 1, which is fixedly disposed on a body of a vehicle (a floor part of the vehicle, for example), is formed by appropriately bending a plate material having a required thickness and comprises a main body 21 having a shape of generally oblong rectangle, a pair of front and rear fixing parts 22 and 22 extending sideward from front and rear ends, respectively, of the main body 21 and a flat plate-shaped guide part 23 formed at a front end of the main body 21. A pin hole 24, in which a pivot pin 11 for rotatably supporting a hereinafter described lever 2 is fitted, is formed at a position near the rear end of the main body 21 of the bracket 1. At a position near an upper front end of the main body 21 of the bracket 1 is secured a hereinafter described pawl teeth member 3.

Pawl Teeth Member 3:

The pawl teeth member 3 is integrally formed of an arcuate plate material and has a plurality of pawl teeth 3a on an outer periphery thereof and a guide part 3b comprising a lower level surface continuing from the pawl teeth 3a. The pawl teeth member 3 is secured to the main body 21 of the bracket 1 with the pawl teeth 3a directed outward. The pawl teeth 3a are arranged along an arc about the pivot pin 11 fitted in the pin hole 24.

Lever 2:

The lever 2 comprises a base end part 2a formed by bending a plate material into a U-shape, an end part 2b continuously extending forward from a front end of the base end part 2a and having a cylindrical shape, and a grip provided over the end part 2b. The base end part 2a has a pair of parallel side plates $2a_1$ and $2a_2$ opposed with each other with a prescribed gap defined therebetween. Each of the paired side plates $2a_1$ and $2a_2$ has a pin hole 31 at a position near a rear end thereof, a pin hole 32 at a position near a lower front end thereof, a pin hole 33 at a position near an upper front end thereof, and a spring receiving hole 34 at a midpoint between the pin holes 32 and 33. The pin holes 31 and 31, the pin holes 32 and 32, the pin holes 33 and 33, and the spring receiving holes 34 and 43 are respectively formed on an axis extending perpendicular to the side plates $2a_1$ and $2a_2$.

A cable guide 6 having a pin hole 35 and an arcuate guide part 36 is secured to one side plate $2a_1$ of the paired side plates $2a_1$ and $2a_2$ with the pin hole 35 aligned with the pin hole 31. The pin hole 24 of the bracket 1 and the pin hole 31 of the lever 2 are aligned and a pin 11 is inserted into the pin holes 24 and 31, whereby the lever 2 is rotatable about the pivot pin 11 in a vertical direction (in the direction of arrows A–B in FIG. 1) with respect to the bracket 1 between first and second positions. A brake wire 10 is trained about the cable guide 6 and an adjuster bolt 9 provided at an end of the brake wire 10 is secured to an end of the guide part 36, so that the brake wire 10 is pulled in a lifting direction thereof (the direction of the arrow A) along with the rotation of the lever 2 to exert a prescribed operating force on a brake connected to the other end of the brake wire 10, thereby generating a braking force. Namely, when the lever 2 is in the first position, the brake is in non-operative state, and when the lever 2 is in the second position, the brake is generating the maximum braking force.

Latch Pawl Member 4:

The latch pawl member 4 is formed of a generally oblong plate and has a oblong pin receiving hole 41 formed at a generally center part with its major axis generally coinciding with the longitudinal direction thereof. The latch pawl member 4 has an engaging part 42 having a linear latch face and a guide part 46 continuing from an end of the engaging part 42 and projecting obliquely upward at one end in the longitudinal direction thereof. At the other end in the longitudinal direction of the latch pawl member is formed an arcuate cam part 44. The latch pawl member 4 also has a latch pawl 43 selectively engageable with the pawl teeth 3a of the pawl teeth member 3 at one end in the lateral direction thereof and a notch like latch part 45 at the other end in the lateral direction thereof.

Figure 3:
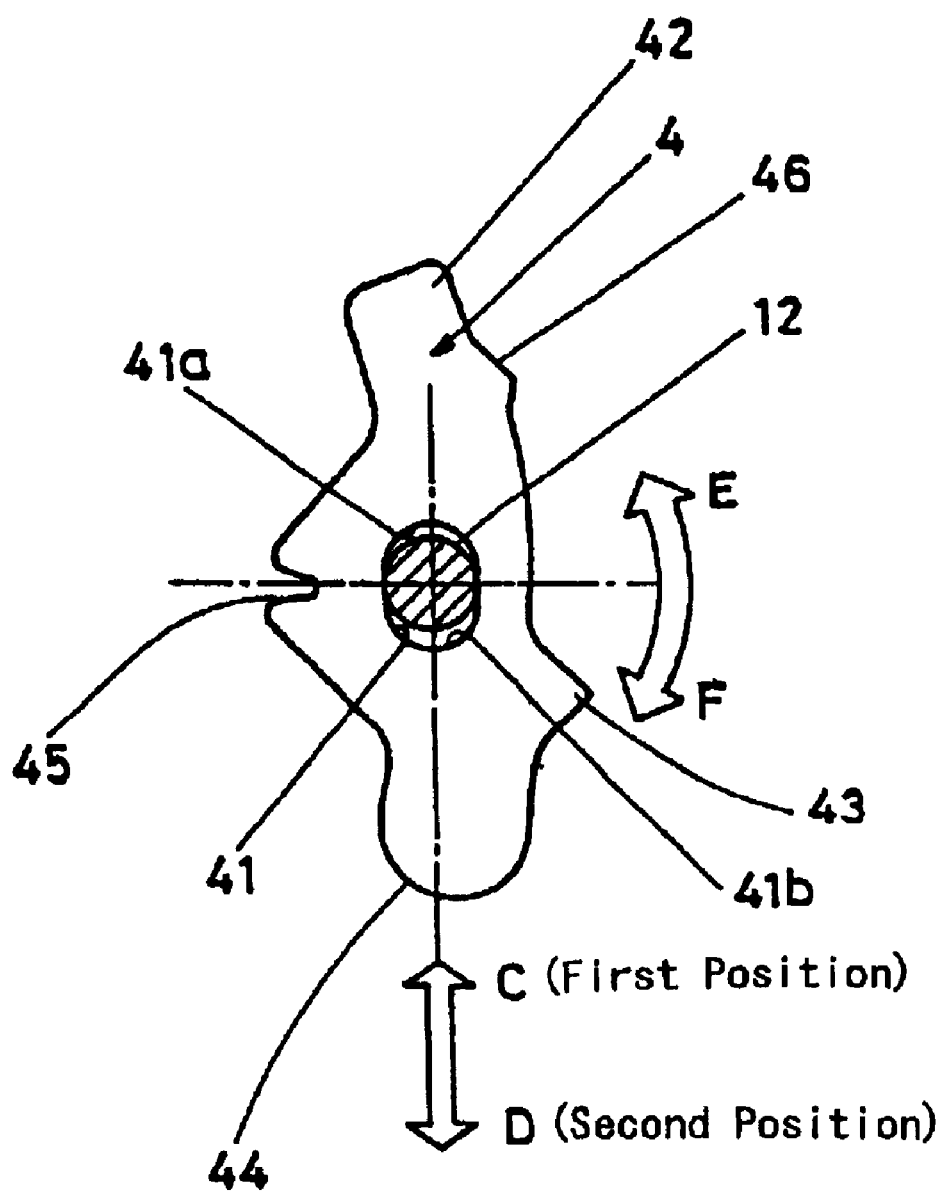
FIG. 3 is a front view of a latch pawl member shown in FIG. 1.

A pin 12 fitted in the pin hole 32 of the lever 2 is inserted into the pin receiving hole 41, whereby the latch pawl member 4 is swingably supported on the lever 2. This makes the latch pawl member 4 rotatable in the direction of arrows E–F about the pin 12 and slidable in the direction of the major axis of the pin receiving hole 41 (the direction of the arrows C–D). For the sake of convenience for explanation, the position of the latch pawl member 4 when it is slid in the direction of the arrow C with respect to the pin 12 and the position of the latch pawl member 4 when it is slid in the direction of the arrow D with respect to the pin 12 are hereinafter referred to as "first position" and "second position", respectively, as shown in FIG. 3.

In the latch part 45 of the latch pawl member 4 is received an action end 7a of a first urging member 7 comprising a torsion spring. A pair of right and left support ends 7b and 7b of the first urging member 7 are received in the spring receiving holes 34 and 34, respectively, of the lever 2. Thus, the position of the action end 7a relative to the support ends 7b and 7b is changed along with rotation of the latch pawl member 4, so that, as mentioned below, a rotational urging force in the direction of the arrow E and a rotational urging force in the direction of the arrow F are selectively exerted on the latch pawl member 4 depending upon the change of the position of the action end 7a relative to the support ends 7b and 7b (see FIG. 3).

In this embodiment, the spring receiving hole 34 of the lever 2 is positioned on a line passing through the pin hole 31 and the pin hole 32 (which will be hereinafter referred to as "reference line L") as shown in FIG. 1. However, the spring receiving hole 34 may not necessarily positioned on the reference line L as long as it is in such a position that the action end 7a of the first urging member 7 is selectively positioned above and below the reference line L in accordance with the movement of the latch pawl member 4 (in other words, in such a position that the latch pawl member 4 can be rotated forward and backward about the pin 12 by the urging force exerted on the action end 7a of the first urging member 7).

Figure 4:
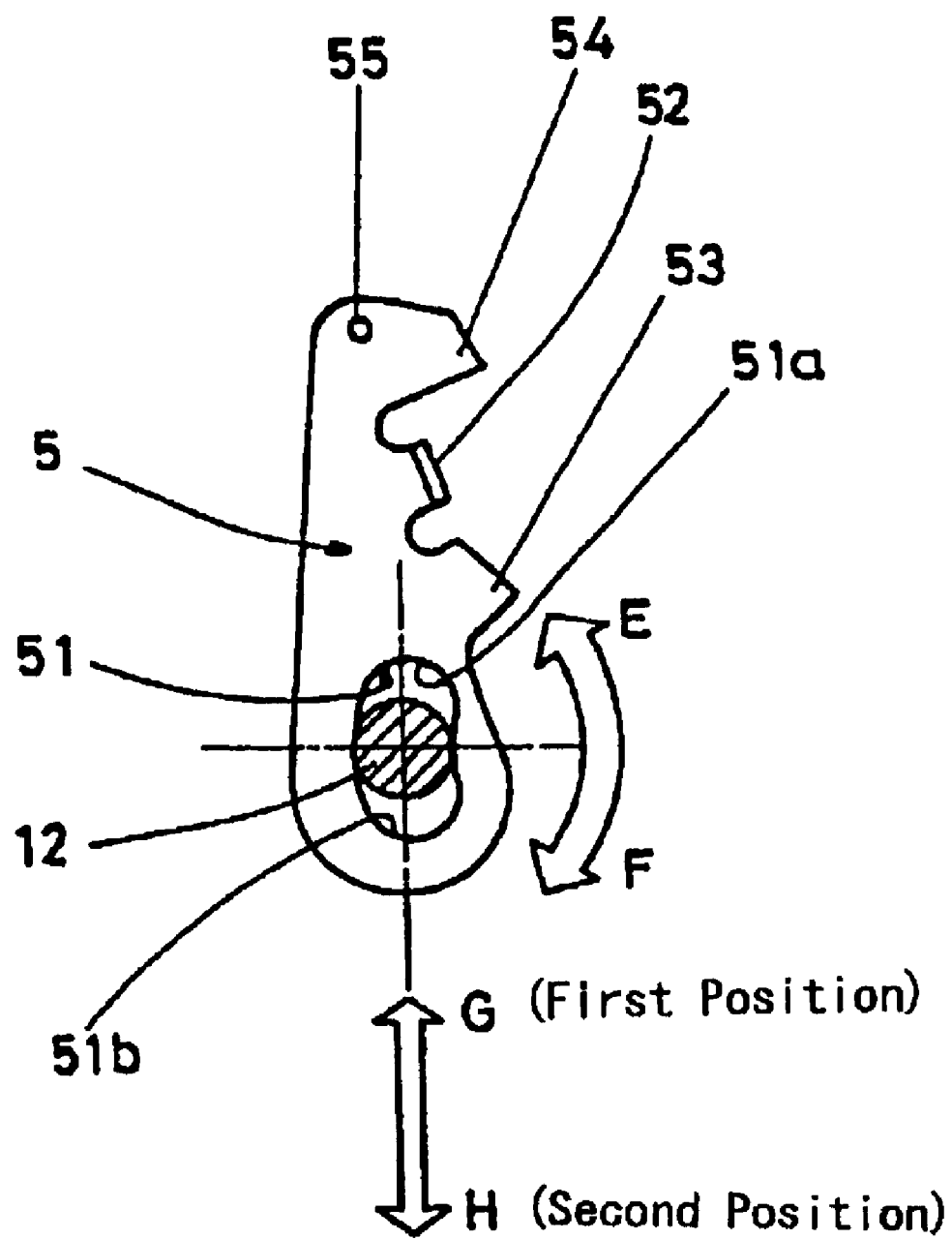
FIG. 4 is a front view of a position changing member shown in FIG. 1.

Position Changing Member 5:

The position changing member 5 is formed of an oblong plate material as shown in FIG. 1, FIG. 2 and FIG. 4 and has a pin receiving hole 51 having an arcuate shape at a position near one end in the longitudinal direction thereof. On the other end side in the longitudinal direction of the Latch pawl member 4, there are provided a stopper part 52 with which the engaging part 42 of the latch pawl member 4 is engaged and a first and second latch pawls 53 and 54 located on both sides of the stopper part 52. The first and second latch pawls, which are selectively engaged with the pawl teeth 3a of the pawl teeth member 3 as described later, have no function for maintaining a position relative to the pawl teeth member 3 (namely, locking function) even in this engaged state.

The position changing member 5 is disposed in the vicinity of the latch pawl member 4 and in opposed relation therewith. The pin 12 fitted in the pin hole 32 of the lever 2 is inserted into the pin receiving hole 51, whereby the position changing member 5 is swingably supported on the lever 2 as is the case with the latch pawl member 4. This makes the position changing member 5 rotatable about the pin 12 in the directions of the arrows E–F and slidable along the arc of the pin receiving hole 51 (the directions of the arrows G–H, for convenience's sake). The position of the position changing member 45 when it is slid in the direction of the arrow G with respect to the pin 12 and the position of the are position changing member 45 when it is slid in the direction of the arrow H will be hereinafter referred to as "first position" and "second position", respectively, for the sake of convenience for explanation.

In the vicinity of the second latch pawl 54 of the position changing member 5 is formed a spring receiving hole 55, to which one end of a second urging member 8 comprising a coil spring is connected. The other end of the second urging member 8 is connected to the pin 13 inserted in the pin holes 33 of the lever 2. Thus, the position changing member 5 is normally rotationally urged in the direction of the arrow E by a spring force of the second urging member 8 (see FIG. 4). The spring force of the first urging member 7 is set at a value which is larger than that of the second urging member 8.

Description of Operation

The operation of the brake operating device $Z_1$ according to the first embodiment will be hereinafter described with reference to FIG. 1 and FIG. 5 to FIG. 11.

Figure 5:
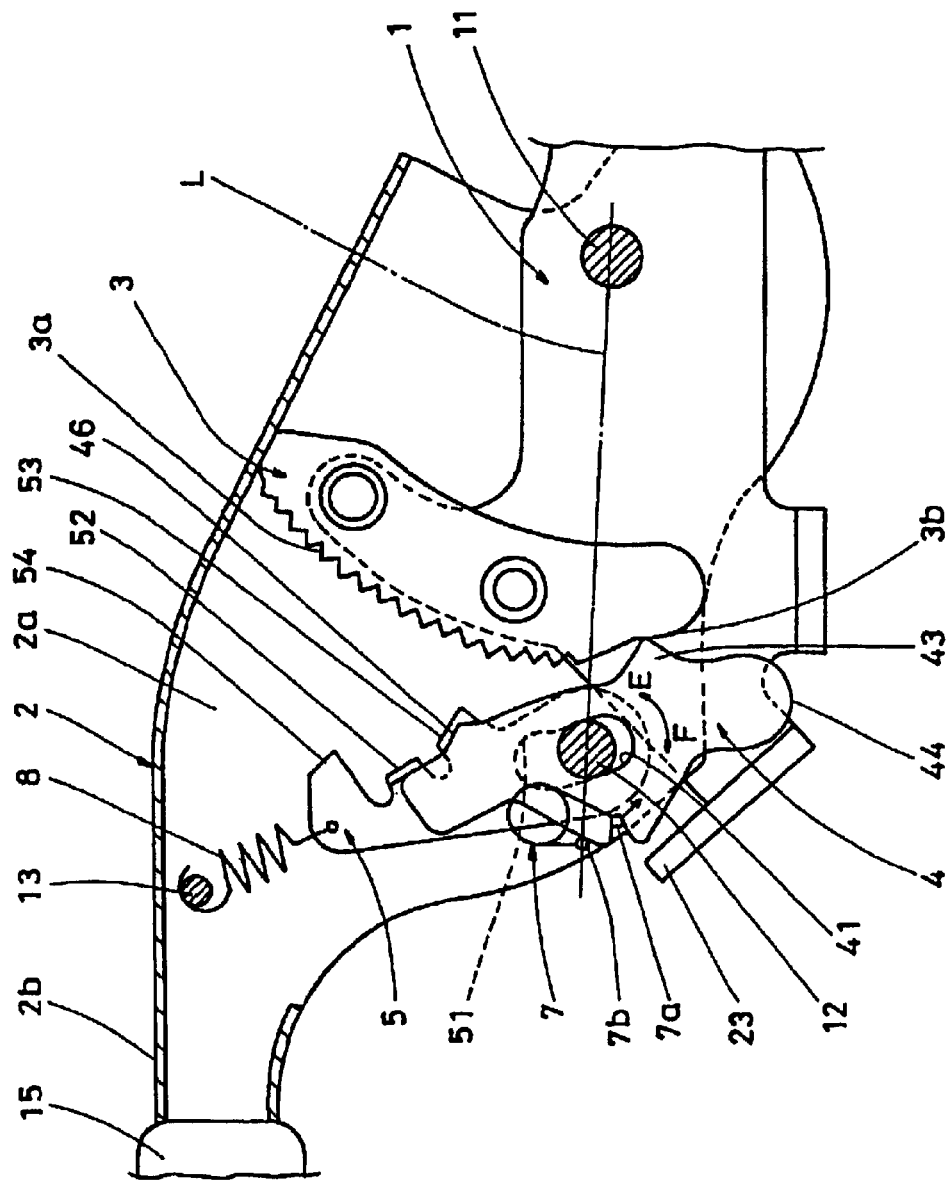
FIG. 5 is an explanatory view illustrating the brake operating device shown in FIG. 1 in a non-released condition.

(1) Non-Operative State (See FIG. 1 and FIG. 5)

The non-operative state shown in FIG. 5 is a state in which no braking force is applied to the brake as when the vehicle is running. The lever 2 has been rotated at maximum in the direction of the arrow B as shown in FIG. 1. In this non-operative state, since the action end 7a of the first urging member 7 is positioned below the reference line L as shown in FIG. 5, the latch pawl member 4 has been forced downward by an urging force exerted on the action end 7a of the first urging member 7 into the "second position" and is normally rotationally urged in the direction of the arrow E. The position changing member 5 has been forced upward by an urging force of the second urging member 8 into the "first position" and the stopper part 52 abuts on the engaging part 42 of the latch pawl member 4. Thus, the latch pawl 43 abuts on the guide part 3b of the pawl teeth member 3 and does not inhibit the lever 2 from rotating at all. At this time, the cam part 44 of the latch pawl member 4 is positioned in the vicinity of a guide part 23 of the bracket 1 and in opposed relation therewith.

Figure 6:
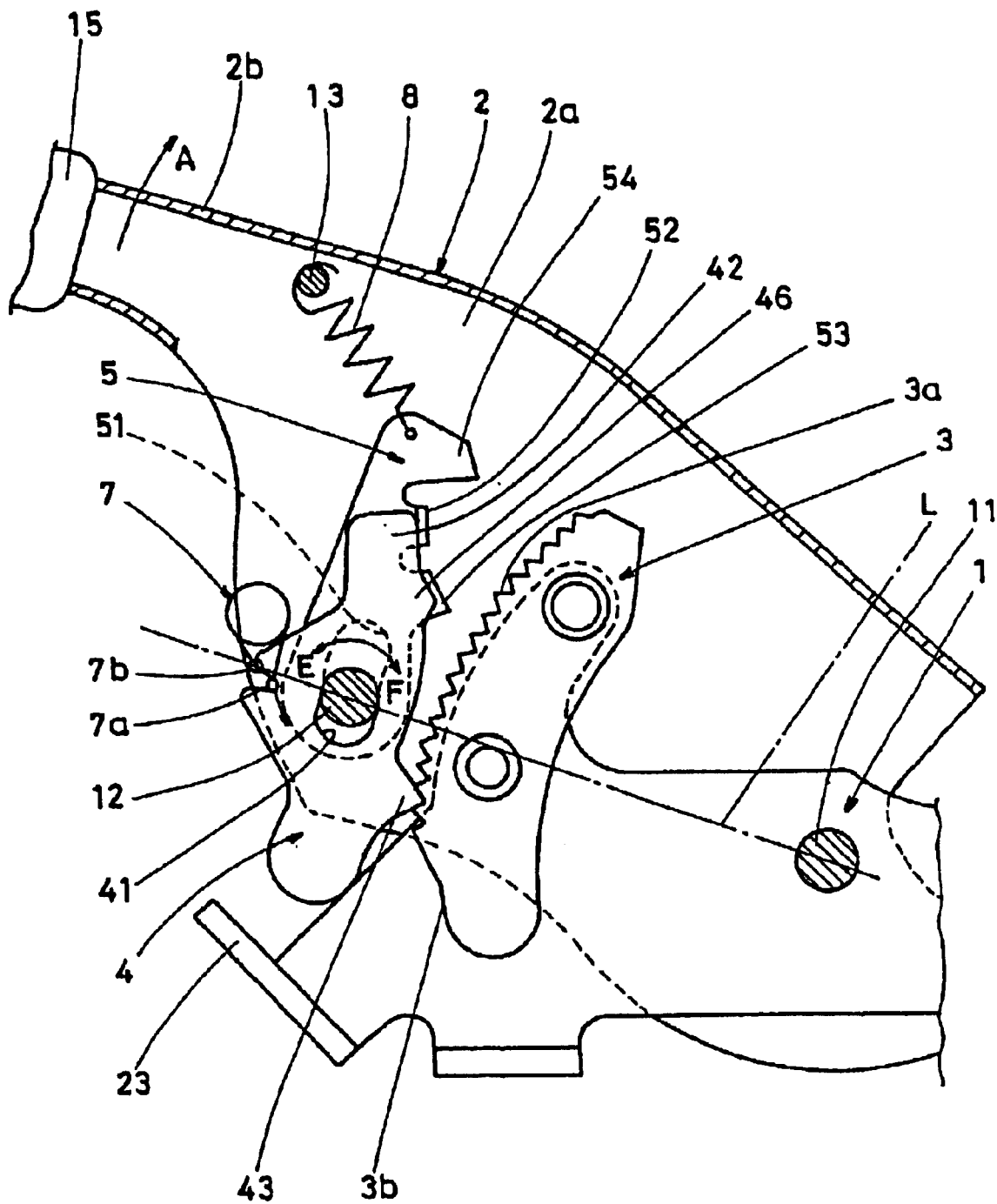
FIG. 6 is an explanatory view illustrating the brake operating device shown in FIG. 1 during braking operation.
Figure 7:
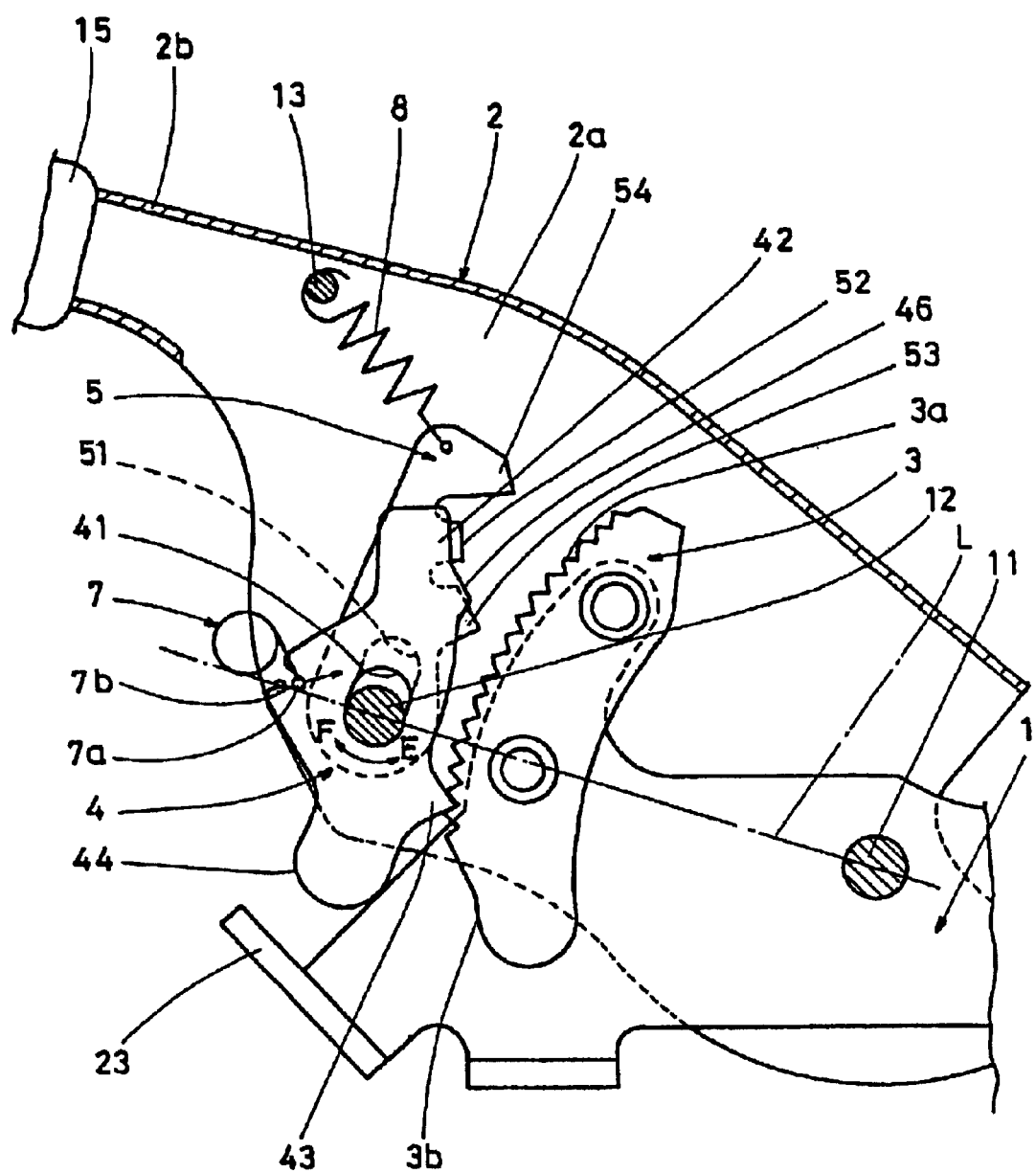
FIG. 7 is an explanatory view illustrating the brake operating device shown in FIG. 1 in a maintained state.

(2) At the Time of Braking Operation from Non-Operative State (See FIG. 5 to FIG. 7)

When the lever 2 is lifted from the non-operative state shown in FIG. 5 in the lifting direction thereof and rotated in the direction of the arrow A, the latch pawl 43 of the latch pawl member 4 is moved from the side of the guide part 3b to the side of the pawl teeth 3a by an upward movement of the latch pawl member 4 along with the rotation of the lever 2, and moved on the pawl teeth 3a repeating engagement therewith and disengagement therefrom while the rotating operation of the lever 2 is being continued (the state shown in FIG. 6). At this time, the latch pawl member 4 is urged by the urging force of the first urging member 7 such that the latch pawl 43 is constantly pressed against the pawl teeth 3a.

When the rotating operation of the pedal 2 in the lifting direction thereof is ceased and the rotating operational force applied thereto is released, a tensile force of the brake wire 10 is exerted on the lever 2, which then receives a restoring rotational force in the direction of the arrow B. At this time, the pin 12 secured to the lever 2 is moved downward together therewith, and the latch pawl member 4 is shifted from the "second position" shown in FIG. 6 to the "first position" shown in FIG. 7. The latch pawl 43 of the latch pawl member 4 is locked with a specific tooth 3a of the pawl teeth member 4 by a pressing force caused by the tensile force of the brake wire cable 10 applied via the pin 12 and maintained in that position. Namely, the braking force corresponding to the amount of rotation of the lever 2 is maintained (namely, in a maintained state after the completion of the braking operation).

At this time, the action end 7a of the first urging member 7 is moved from below (see FIG. 6) to above (see FIG. 7) the reference line L along with the movement of the latch pawl member 4 from the "second position" to the "first position", and an urging force generated at the action end 7a of the first urging member 7 urges the latch pawl member 4 in the direction of the arrow F (namely, in such a direction that the latch pawl 43 is moved away from the pawl teeth 3a of the pawl teeth member 3). However, the urging force of the first urging member 7 is smaller than that caused by the tensile force of the brake wire 10, so that the latch pawl member 4 is maintained in the position with the latch pawl 43 in locking engagement with the pawl teeth 3a of the pawl teeth member 43 irrespective of the urging force of the first urging member 7. The position of the latch pawl member 4 at this time is the locked position mentioned in claims.

Figure 8:
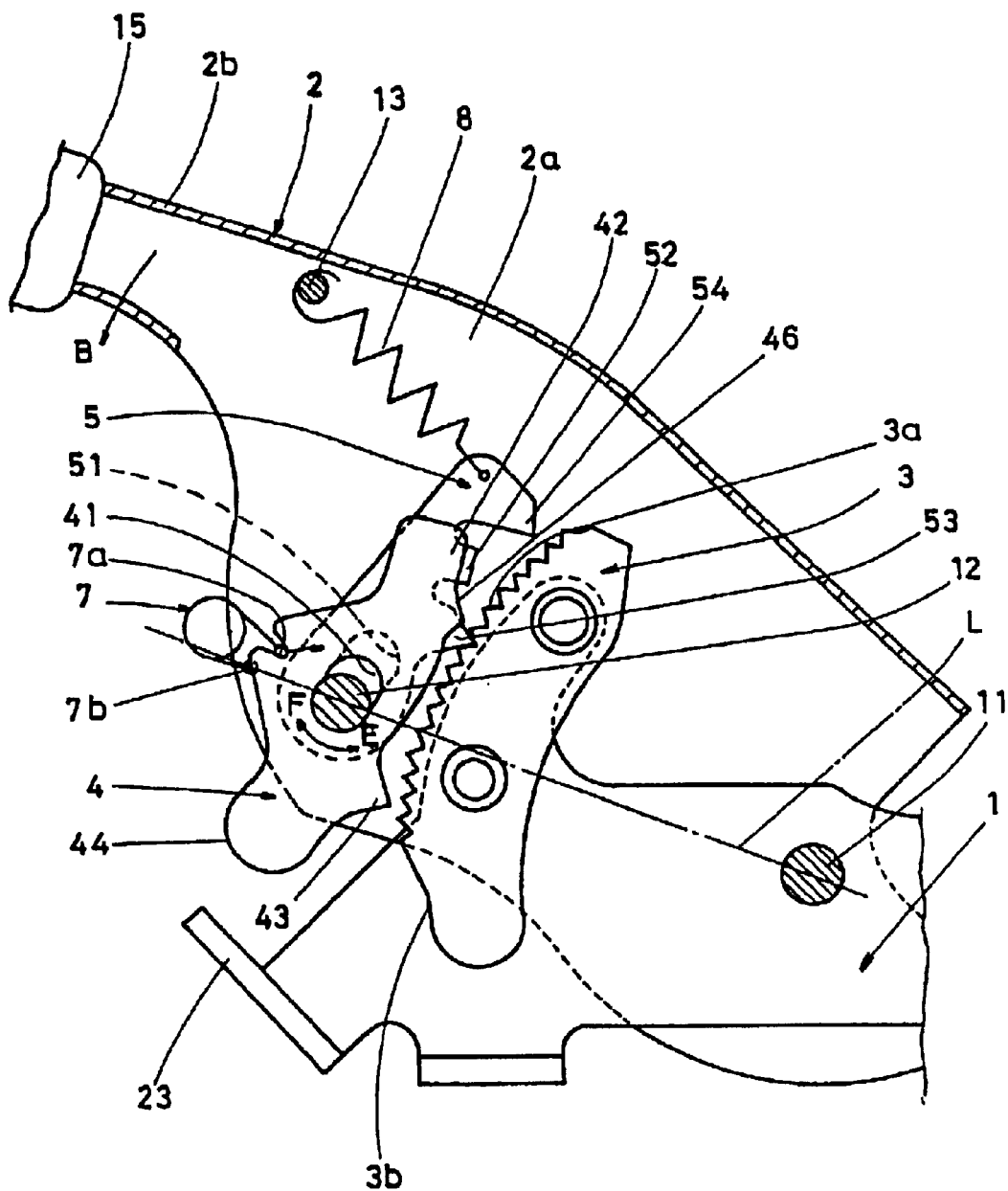
FIG. 8 is an explanatory view illustrating the brake operating device shown in FIG. 1 in an unlocked state.

(3) Releasing Operation of Braking Maintained State (See FIG. 8)

When the braking maintained state shown in FIG. 7 is released prior to releasing the braking force to permit the vehicle to run or conducting additional lifting of the lever 2 to increase the braking force, the lever 2 is first slightly lifted from the rotational position in the braking maintained state in the lifting direction thereof and rotated in the direction of the arrow A by a prescribed amount as shown in FIG. 8. The "prescribed amount" is an amount capable of releasing the locking engagement of the latch pawl 43 with the pawl teeth 3a.

Then, since the pressing force exerted between the latch pawl 43 of the latch pawl member 4 and the pawl teeth 3a of the pawl teeth member 3 is vanished, the latch pawl member 4 is rotated in the direction of the arrow F by the urging force of the first urging member 7 and the locking engagement of the latch pawl 43 with the pawl teeth 3a of the pawl teeth member 3 is released. The position of the latch pawl member 4 at this time is the "unlocked position" mentioned in the claims.

At this time, along with the rotation of the latch pawl member 4 in the direction of the arrow F, the rotational force thereof is transmitted via the engaging part 42 of the latch pawl member 4 to the stopper part 52 of the position changing member 5, so that the position changing member 5 is rotated in the direction of the arrow F against the urging force of the second urging member 8 and the second latch pawl 53 thereof is brought into engagement with one of the pawl teeth 3a of the pawl teeth member 4, whereby the position changing member 5 is inhibited from further rotating in the direction of the arrow F.

The second latch pawl 53 of the position changing member 5 is pressed against the pawl teeth 3a of the pawl teeth member 3 by the difference between the urging force of the first urging member 7 and the urging force of the second urging member 8, so that the position changing member 5 and the latch pawl member 4 are both rotatable in the direction of the arrow E.

Figure 9:
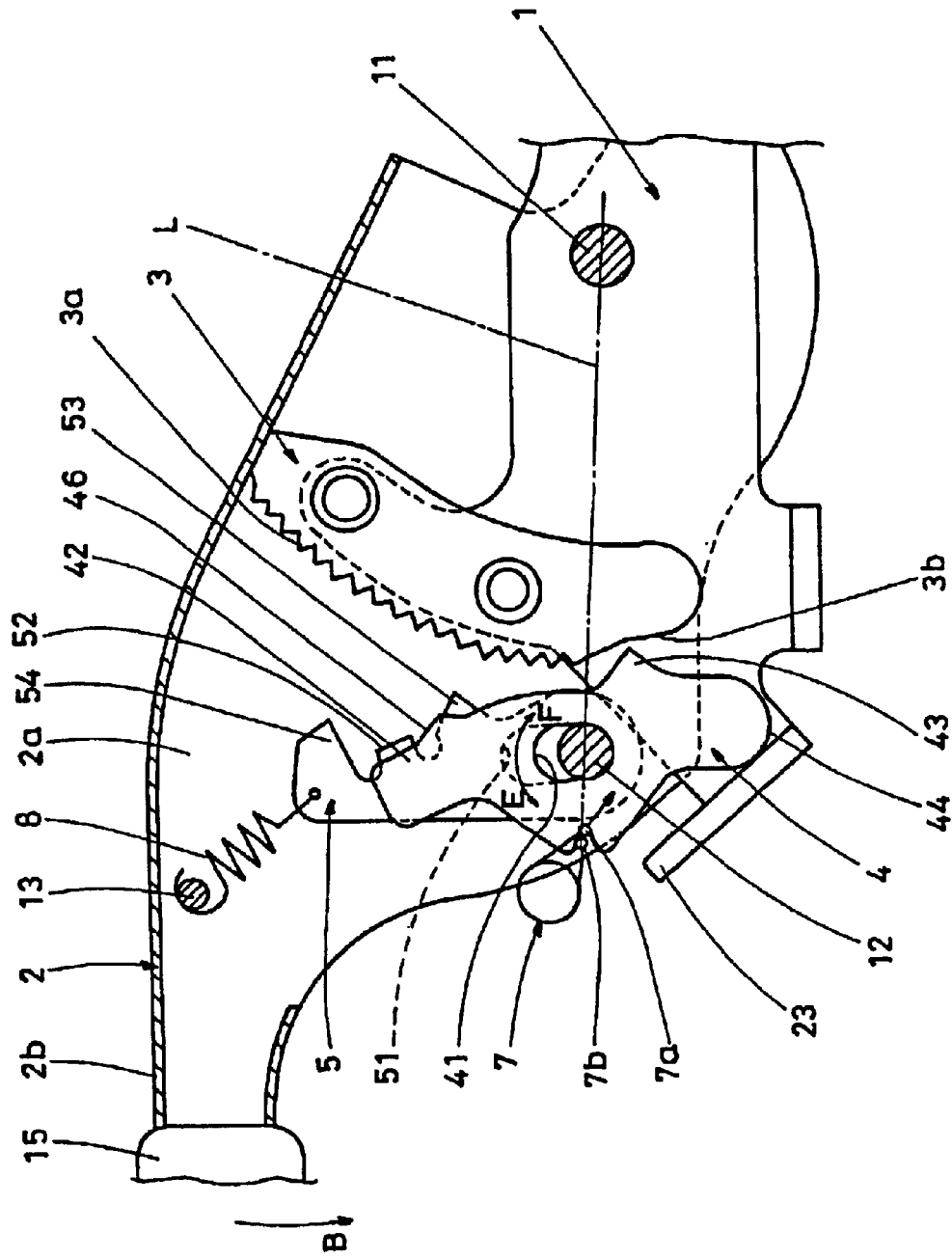
FIG. 9 is an explanatory view illustrating the brake operating device shown in FIG. 1 during transition from the unlocked state to the non-released state.

(4) Operation for Releasing Braking Force (See FIG. 8 and FIG. 9)

In order to vanish the braking force by rotating the lever 2 in the direction of the arrow B from the state in which the braking has been released, it is only necessary that the lever 2 is rotated in the direction of the arrow B by the tensile force of the brake wire 10 from the state shown in FIG. 8 (the state in which the braking is released).

Along with the rotating operation of the lever 2 in the direction of the arrow B, the second latch pawl 53 of the position changing member 4 is slid on the pawl teeth 3a of the pawl teeth member 3 repeating engagement therewith and disengagement therefrom to allow the lever 2 to rotate in the direction of the arrow B. When the latch pawl member 4 is moved downward along with the rotation of the lever 2 in the direction of the arrow B and the latch pawl 43 thereof is moved away from the position corresponding to the pawl teeth 3a of the pawl teeth member 3 to the side of the guide part 3b, the action end 7a of the first urging member 7 is moved from above the reference line L (the state shown in FIG. 8) to below the reference line L (the state shown in FIG. 9) as shown in FIG. 9 and the urging force of the first urging member 7 acts to urge the latch pawl member 4 in the direction of the arrow E. Along with the rotation of the latch pawl member 4 in the direction of the arrow E by the urging force of the first urging member 7, the position changing member 5 is rotated in the direction of the arrow E by the urging force of the second urging member 8, whereby the first latch pawl 53 thereof is moved away from the pawl teeth 3a of the pawl teeth member 3.

When the lever 2 is further rotated in the direction of the arrow B from the above state, the cam part 44 of the latch pawl member 44 is brought into contact with the guide part 23 of the bracket 1 and the latch pawl member 4 is forcibly rotated in the direction of the arrow E by a pressing force of the guide part 23. Then, when the lever 2 is rotated at maximum in the direction of the arrow B to reach its first position, the latch pawl 43 of the latch pawl member 4 is brought into contact with the guide part 3b of the pawl teeth member 3, whereby the brake operating device $Z_1$ is set in the non-operative state shown in FIG. 5. Thereby, the braking force is completely released, so that the vehicle can be driven.

(5) Additional Lifting from the Braking Released State (See FIG. 6, FIG. 7, FIG. 10 and FIG. 11)

Figure 10:
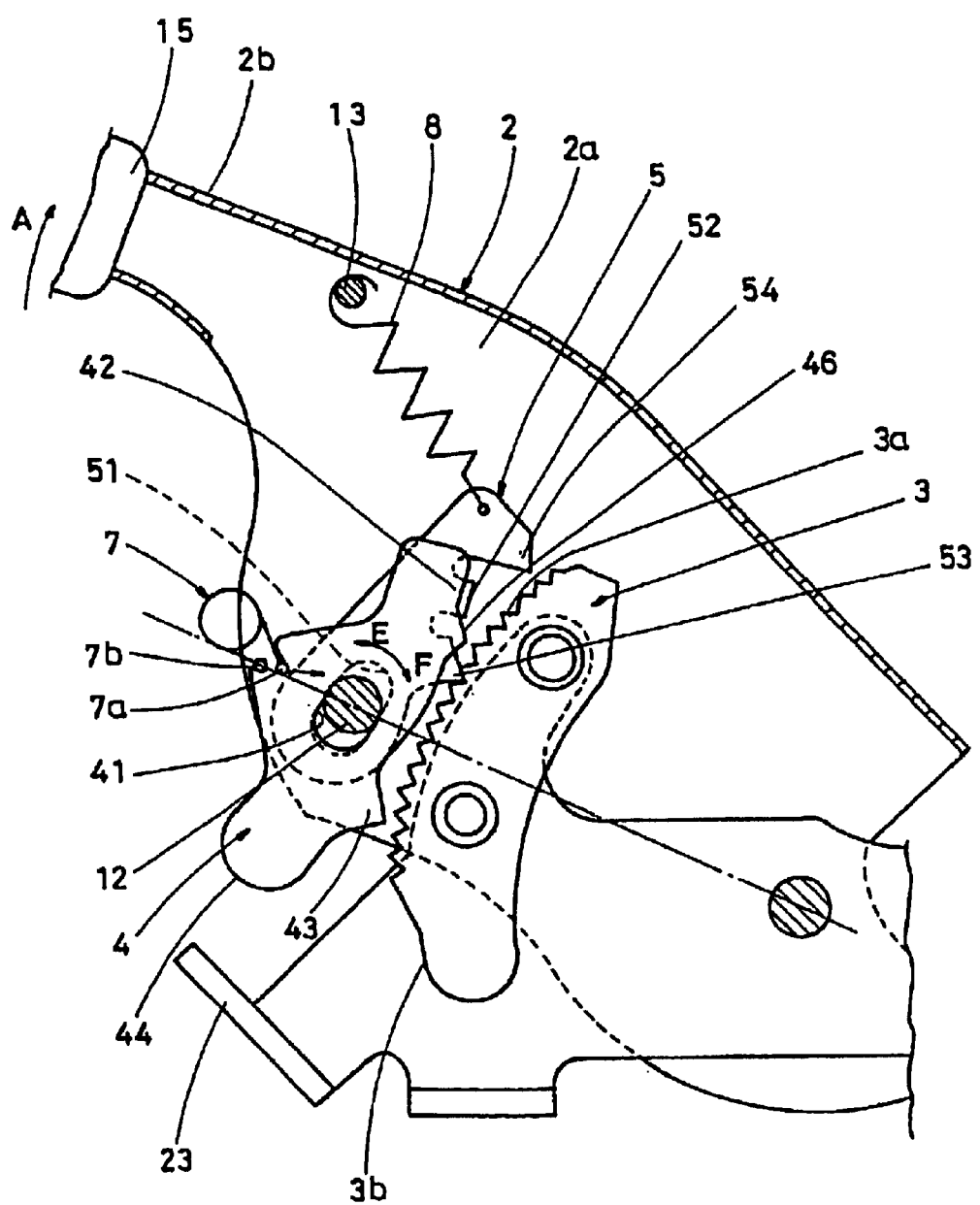
FIG. 10 is an explanatory view illustrating the brake operating device shown in FIG. 1 during rebraking operation from the unlocked state.
Figure 11:
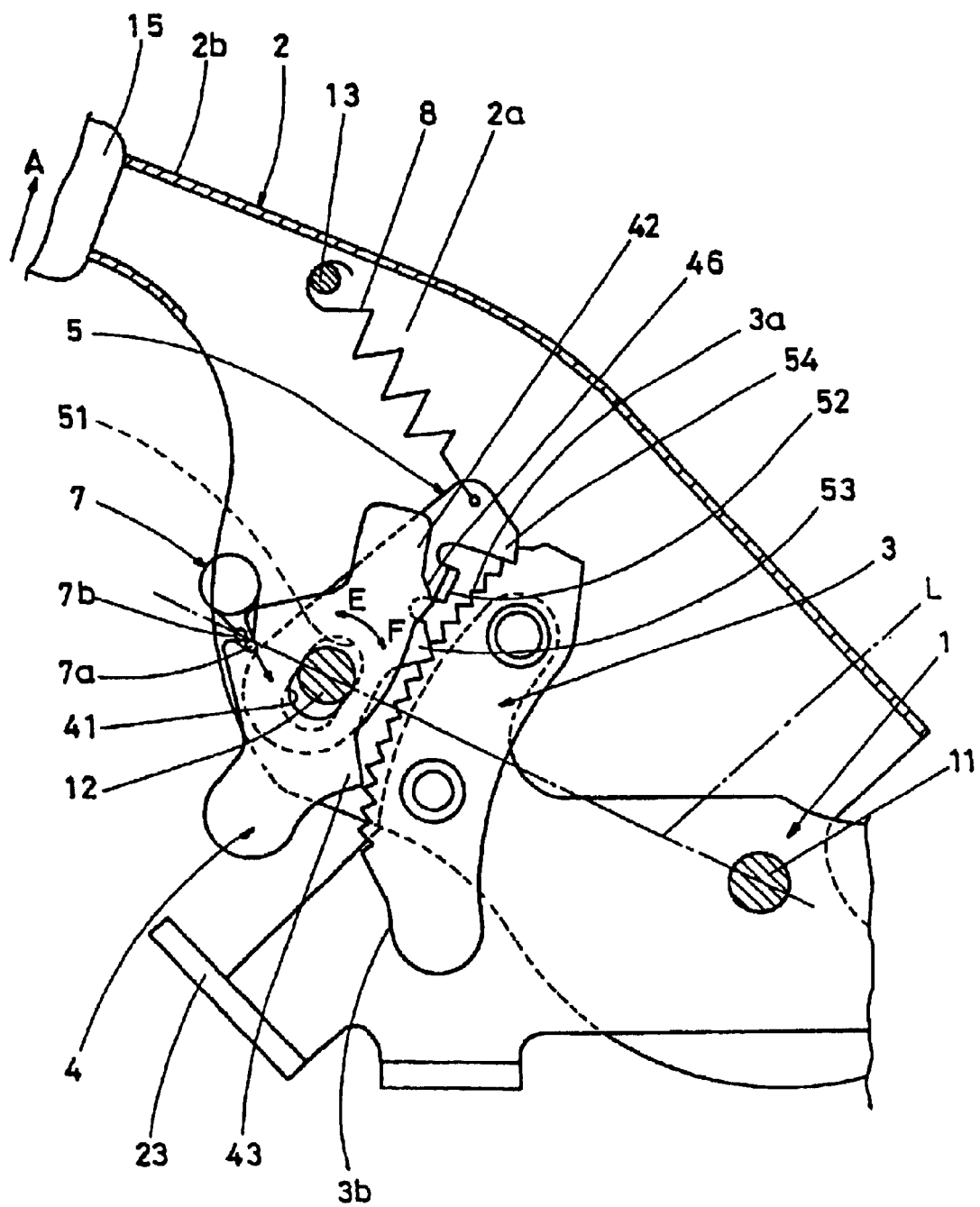
FIG. 11 is an explanatory view illustrating the brake operating device shown in FIG. 1 in a state immediately after the rebraking operation.

When the braking force set by an initial braking operation is thought to be insufficient, for example, an additional lifting is conducted to additionally increase the braking force. Namely, in this case, the lever 2 is rotated in the lifting direction thereof (the direction of the arrow A) from the braking released state shown in FIG. 8. Then, the pin 12 is moved upward by the rotating operation and the latch pawl member 4 is shifted from the "second position" to the "first position" as shown in FIG. 10. When the lever 2 is further lifted, the latch pawl member 4 is moved upward. Then, the latch pawl member 4 is moved relative to the position changing member 5 and the part of the latch pawl member 4 abutting on the stopper part 52 of the position changing member 5 is changed from the engaging part 42 to the guide part 46.

Along with the movement of the latch pawl member 4 relative to the position changing member 5, the action end 7a of the first urging member 7 is moved from above to below the reference line L and the latch pawl member 4 is urged to rotate in the direction of the arrow E by the urging force of the first urging member 7. Then, finally, the latch pawl 43 is brought into locking engagement with one of the pawl teeth 3a of the pawl teeth member 3 as shown in FIG. 6. The position changing member 5 receives a pressing force from the latch pawl member 4 and is urged to rotate in the direction of the arrow F, whereby the second latch pawl 54 is brought into engagement with one of the pawl teeth 3a of the pawl teeth member 3 in addition to the first latch pawl 53. Thereby, the position changing member 5 is inhibited from further rotating in the direction of the arrow F. Then, finally, as shown in FIG. 6, an action for inhibiting the position changing member 5 from rotating along with the rotation of the latch pawl member 4 in the direction of the arrow E is released, whereby the position changing member 5 is rotated in the direction of the arrow E by the urging force of the second urging member 8 and the first latch pawl 53 and the second latch pawl 54 are both removed from the pawl teeth member 3. Thereby, the transition to a state in which braking operation is conductible shown in FIG. 6 is completed.

After that, the lever 2 is lifted to a desired rotational position (namely, a position where a desired braking force can be obtained) and rotated in the direction of the arrow A. After the rotation, when the lifting force applied to the lever 2 is released, the latch pawl 43 of the latch pawl member 4 is brought into locking engagement with one of the pawl teeth 3a of the pawl teeth member 3 and maintained in that state as shown in FIG. 7. Thereby, the additional lifting operation is completed.

As the action in the braking release operation after the additional lifting operation is the same as that described in above (3) and (4), the description is omitted here.

As is described above, in the parking brake device $Z_1$ according to the first embodiment, a required braking force can be generated and maintained by manually rotating the lever 2 in the lifting direction thereof. Also, the maintained state is released and an operation for releasing the braking force by restoring the lever 42 in the direction opposite to the lifting direction thereof is permitted by lifting the lever 2 in the lifting direction thereof by a prescribed amount from the maintained state. Moreover, the braking force can be increased and maintained by "additional lifting", namely lifting the lever 42 by an amount beyond the above prescribed amount from the maintained state.

In the parking brake operating device $Z_1$ according to this embodiment, the braking force can be released only by lifting the lever 2 by the prescribed amount. Thus, in contrast to a conventional brake operating device in which a braking force is released by pressing a push button provided at an end of the lever, there is no possibility that a push button is pressed by mistake and the braking force is unexpectedly released, so that the reliability in operating the parking brake operating device $Z_1$ is enhanced for that.

Also, since the parking brake operating device $Z_1$ according to this embodiment has no push button for releasing the braking force on the lever 2 in contrast to the conventional parking brake operating device, the lever 2 can be formed without consideration of provision of the push button, so that the workability thereof is improved. This leads to lowering of manufacturing cost of the lever 2, which in turn makes the brake operating device $Z_1$ less expensive.

Additionally, since the parking brake operating device $Z_1$ according to this embodiment has no push rod for releasing the braking force in the lever 2 in contrast to the conventional parking brake operating device, the lever 2 can be set in an arbitrary shape without consideration of operability of the push rod in designing the shape of the lever 2. A second embodiment in which the freedom in designing the shape of the lever 2 is utilized to the maximum will be hereinafter described.

Second Embodiment

Figure 12:
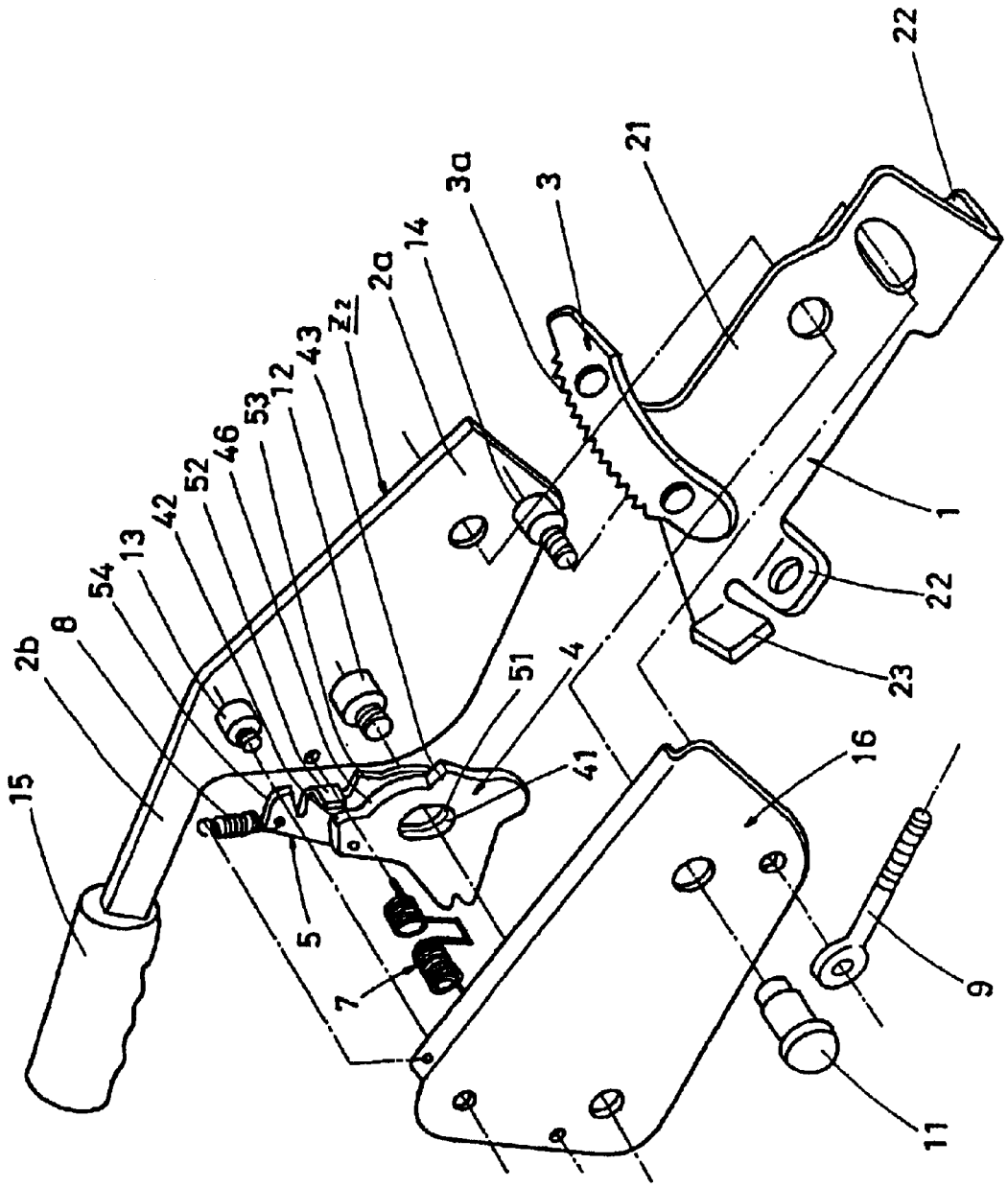
FIG. 12 is an exploded perspective view illustrating a brake operating device according to a second embodiment of the present invention.

A brake operating device $Z_2$ according to a second embodiment shown in FIG. 12 is the same in the basic constitution as the brake operating device $Z_1$ according to the first embodiment. The differences between those are the construction of the lever 2 and the connecting structure of the brake wire 10. Description will be hereinafter made of the structure of the brake operating device $Z_2$ according to the second embodiment focusing on the differences. The other structure and operation of the brake operating device $Z_2$ will be understood with the aid of the description of the first embodiment, and the description thereof will be omitted.

In the brake operating device $Z_2$ of the second embodiment, the lever 2 is formed of one plate material. A cover member 16 formed of one plate material is disposed on one side of a base end part 2a of the lever 2 in opposed relation thereto with a prescribed gap defined therebetween. Between the base end part 2a of the lever 2 and the cover member 16 are disposed a bracket 1 including a pawl teeth member 3, a latch pawl member 4 and a position changing member 5. An adjuster bolt 9 connected to an end of a brake wire 10 (not shown) is secured to a pin 14 joining the lever 2 and the cover member 16 so that the brake wire 10 may be directly pushed or pulled by rotational operation of the lever 2.

In the brake operating device $Z_2$ constituted as above, the lever 2 is formed of one plate material, so that the shaping thereof is easy, thus reducing the cost. Also, since the lever 2 is formed of one plate material, the shape thereof can be changed as desired (depending upon the mounting position of the parking brake operating device, for example), so that the degree of freedom in layout of the parking brake operating device $Z_2$ on a vehicle can be enhanced.

Same examples of the shape of the lever 2 are shown in FIG. 13 to FIG. 16.

Figure 13:
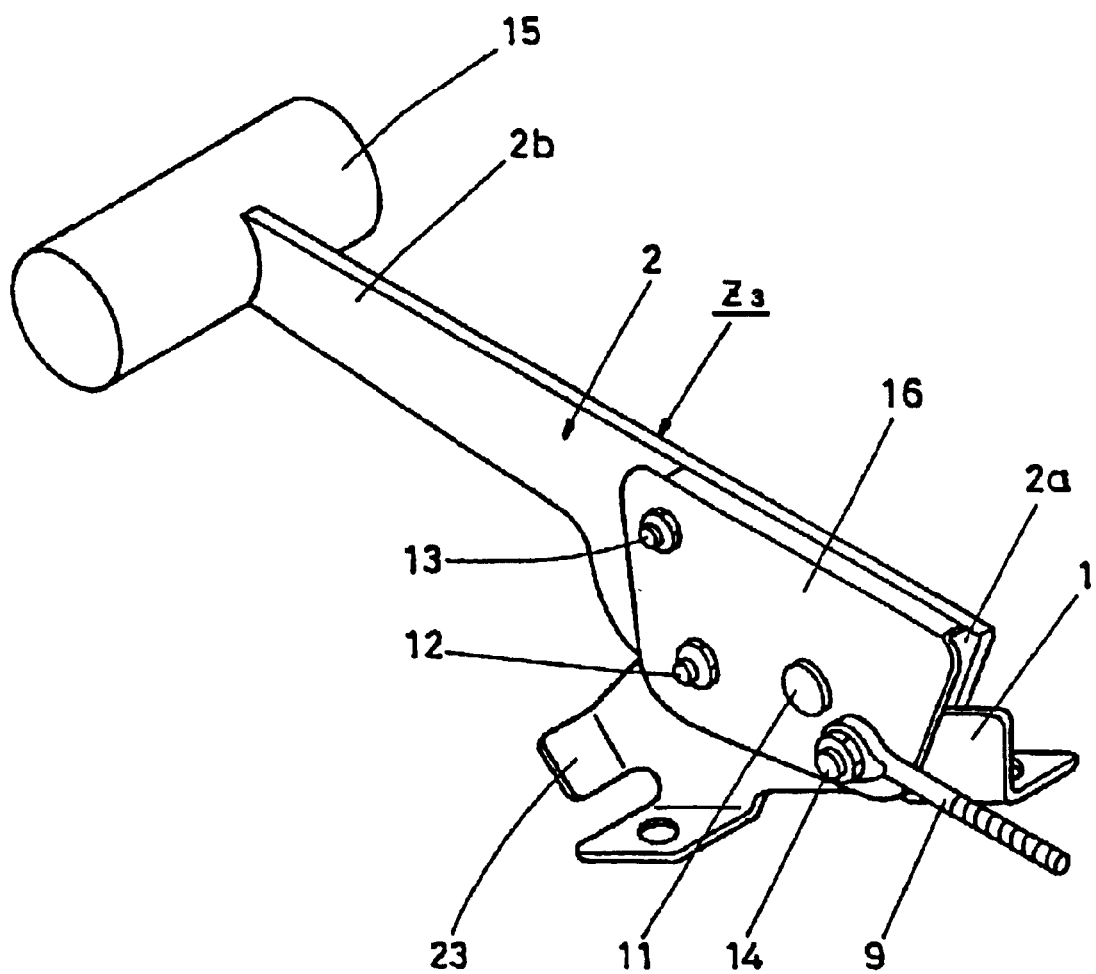
FIG. 13 is a perspective view illustrating a first modification of the device shown in FIG. 12.

In a brake operating device $Z_3$ shown in FIG. 13, a grip 15 provided at an end part of the lever 2 is oriented in a direction perpendicular to the extending direction of the lever 2. This example is desirable when the brake operating device $Z_3$ is arranged similarly to a shift knob of an automatic transmission.

Figure 14:
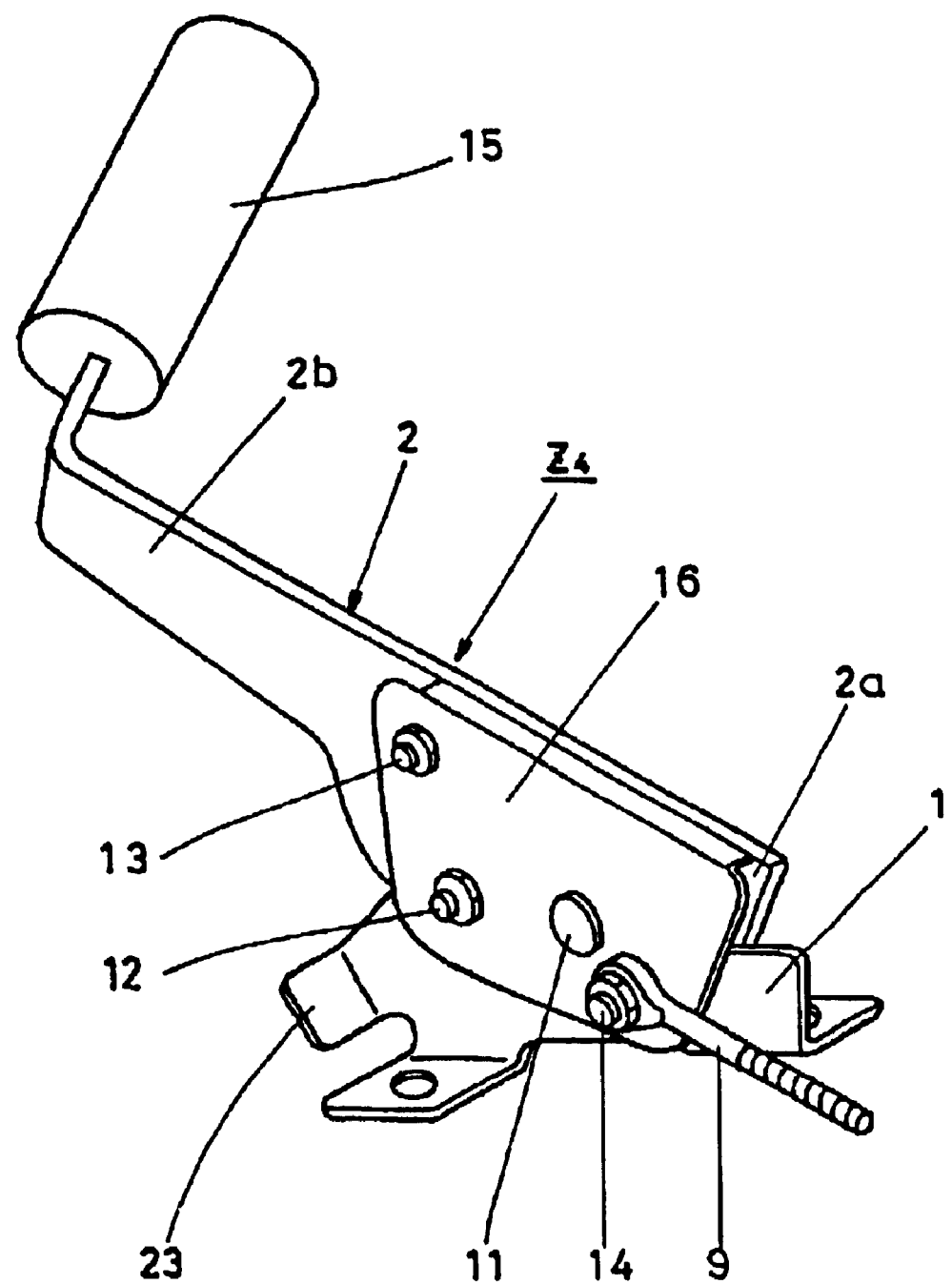
FIG. 14 is a perspective view illustrating a second modification of the device shown in FIG. 12.

In a brake operating device $Z_4$ shown in FIG. 14, the lever 2 has an end part 2b bent and fitted with a grip 15. With this constitution, when the brake operating device $Z_4$ is disposed in the vicinity of a change lever on a vehicle body, a space which ensures positive operation of the grip 15 and the change lever can be secured therebetween by setting the bending direction of the grip 15 in a direction away from the change lever. Thus, this example has advantages in its operability and sureness of operation.

Figure 15:
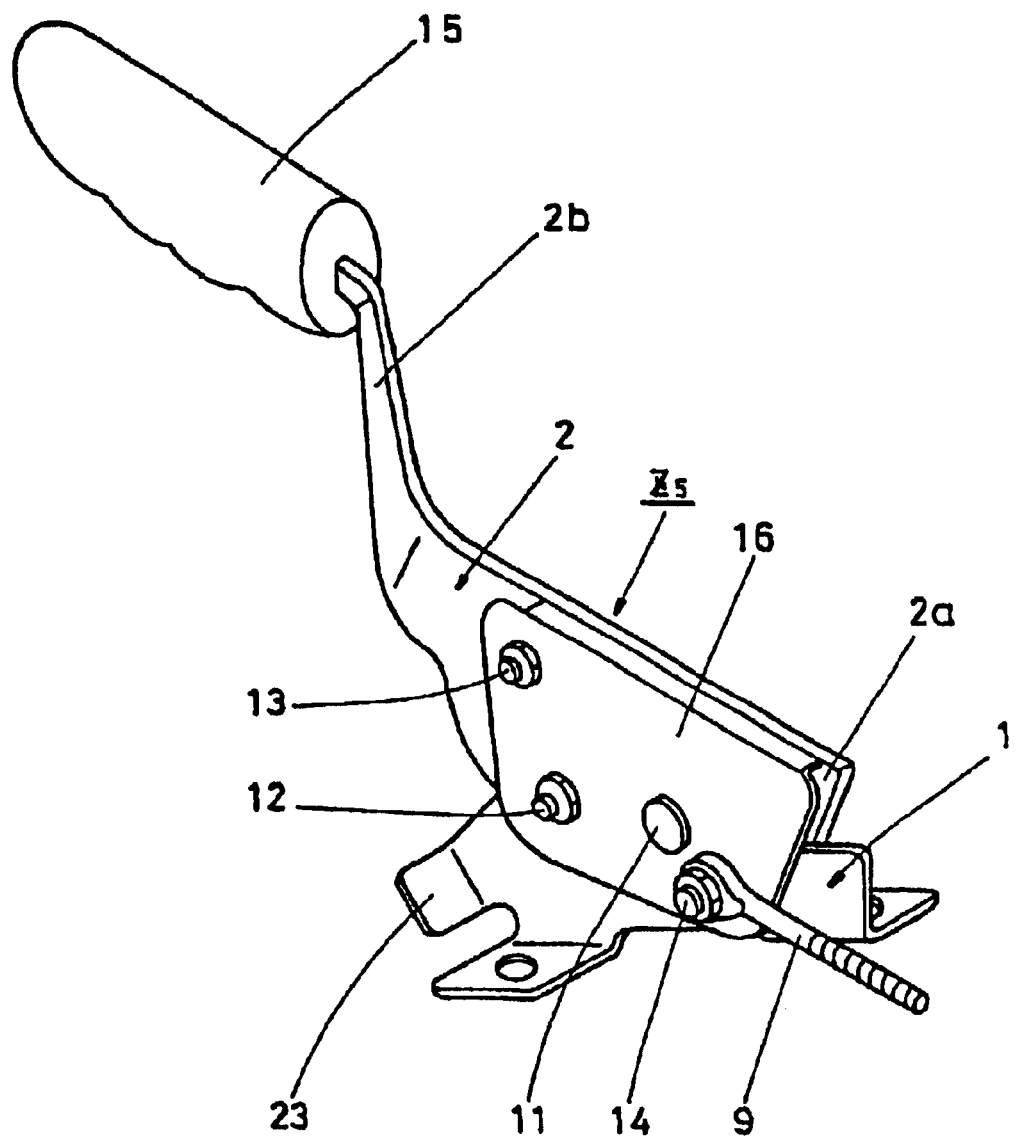
FIG. 15 is a perspective view illustrating a third modification of the device shown in FIG. 12.

In a brake operating device $Z_5$ shown in FIG. 15, a large offset amount is secured between the end part 2b of the lever 2 and the end part 2b (namely, the grip 15). This example is desirable when the brake operating device $Z_4$ is disposed in the vicinity of a change lever on a vehicle body as in the case with the example shown in FIG. 14.

Figure 16:
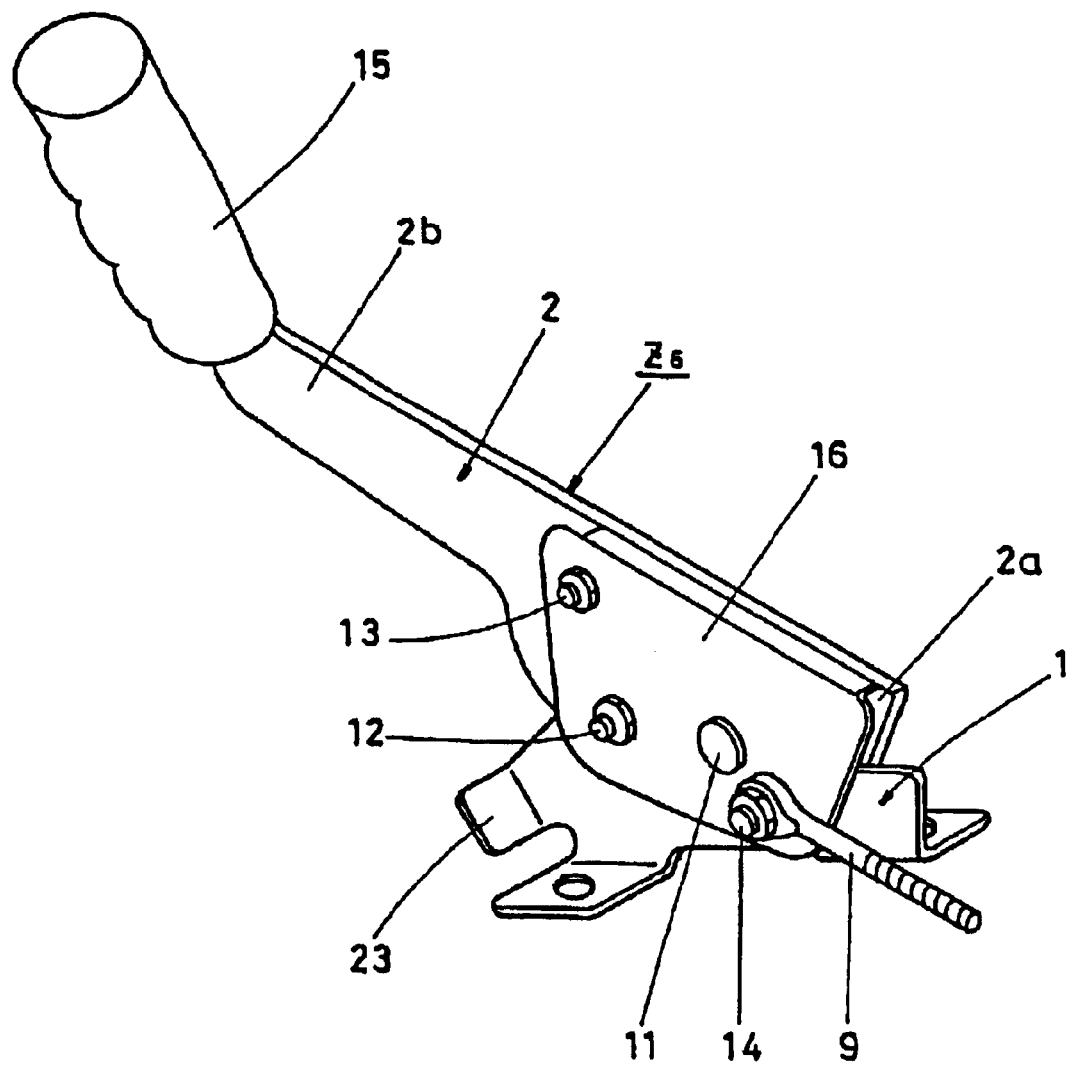
FIG. 16 is the perspective view illustrating a fourth modification of the device shown in FIG. 12.
Figure 17:
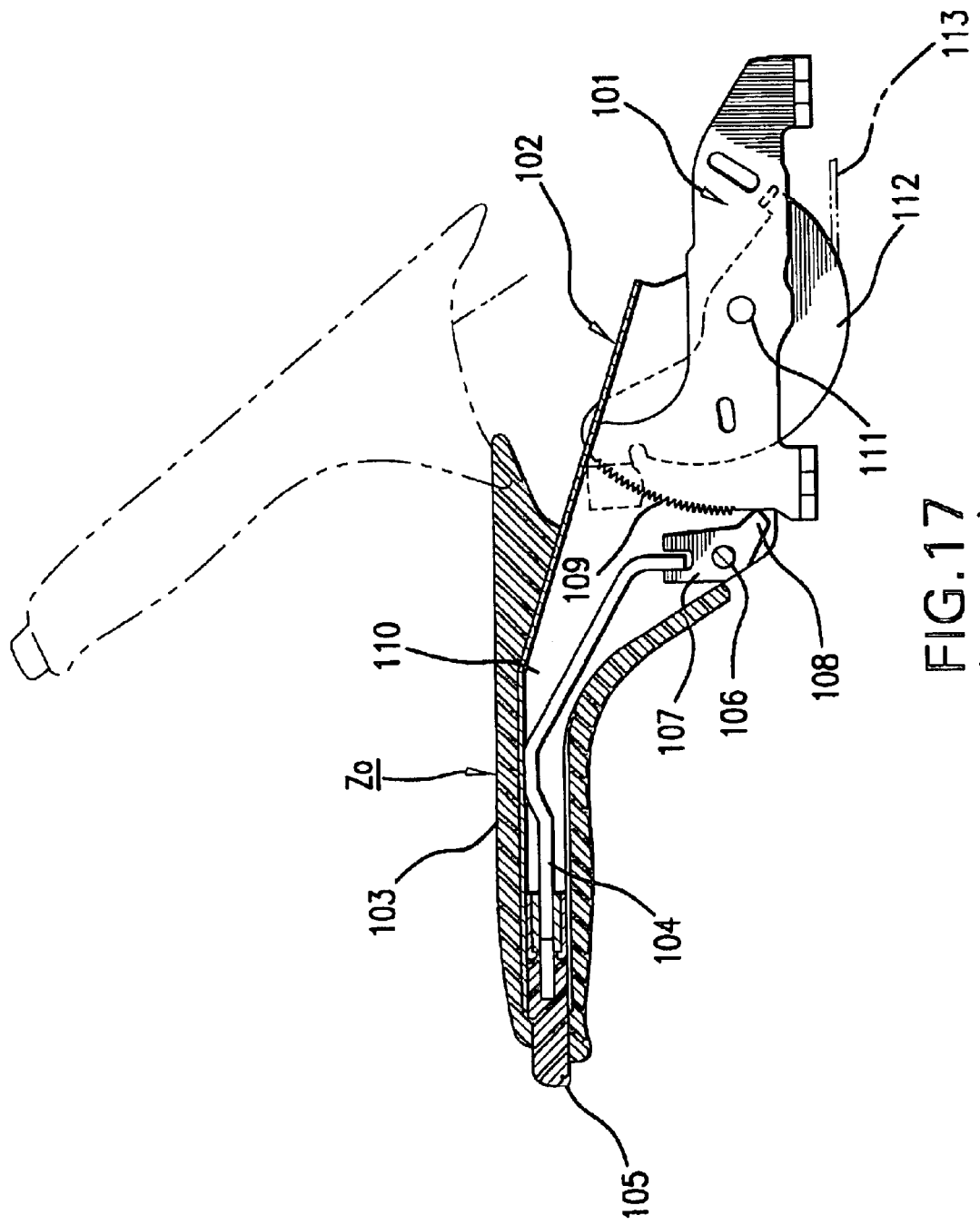
FIG. 17 is a cross-sectional view illustrating a conventional operating device for a vehicle parking brake.

In the brake operating device $Z_6$ shown in FIG. 16, the lever 2 has an end part 2b bent upward and fitted with a grip 15. With this constitution, the grip 15 can be set at a high position even when the brake operating device $Z_6$ is arranged in a lower position on the floor of the vehicle body. Thus, this example has advantages in its layout properties and operability.

In the above embodiments, the pawl teeth member 3 is arranged on the side of the mounting bracket 1 and the latch pawl member 4 and the position changing member are arranged on the side of the lever 2. However, the present invention is not limited to the constitution and it is needless to say that the latch pawl member 4 and the position changing member may be provided on the side of the lever 2 with the pawl teeth member provided on the side of the lever 2.

What is claimed is:

1. A brake operating device for a vehicle provided with a brake, comprising:

a mounting bracket secured to said vehicle;

a manually operable lever pivotally connected to said bracket for rotation between first and second positions, said lever being operatively connected to said brake so that a braking force corresponding to an amount of rotation from said first position toward said second position is exerted on said brake;

a pawl teeth member having pawl teeth and secured to said bracket;

a latch pawl member supported on said lever and having a first latch pawl engageable with said pawl teeth of said pawl teeth member, said latch pawl member being movable between a locked position in which said first latch pawl is in locking engagement with said pawl teeth and an unlocked position in which said engagement of said first latch pawl with said pawl teeth is released, said latch pawl member (1) assuming said locked position when said lever is rotated from said first position toward said second position, to maintain said lever in a rotational position and (2) assuming said unlocked position when said lever is further rotated from said rotational position toward said second position by a prescribed amount, to release said locking engagement of said first latch pawl with said pawl teeth so that said lever can rotate in either direction; and a position changing member supported on said lever by a single pin and engageable by said latch pawl member so that said latch pawl member is shifted from said unlocked position to said locked position when said lever is further rotated from said rotational position toward said second position and beyond said prescribed amount.

2. The brake operating device of claim 1 wherein said position changing member carries a stopper portion and wherein said latch pawl member has an engageable end portion engageable with said stopper portion.

3. The brake operating device according to claim 2 wherein said position changing member has a second latch pawl engageable with said pawl teeth.

4. The brake operating device according to claim 3 wherein said pawl latch member is supported on said lever by said single pin and has a guide portion which is located intermediate said single pin and said engageable end portion and which engages said stopper portion when said lever is further lifted beyond said prescribed amount, wherein said position changing member carries a third latch pawl, and wherein said second and third latch pawls engage said pawl teeth responsive to said guide portion of said pawl latch member engaging said stopper portion.

* * * * *